US007268703B1

(12) United States Patent
Kabel et al.

(10) Patent No.: US 7,268,703 B1
(45) Date of Patent: Sep. 11, 2007

(54) METHODS, SYSTEMS, AND DEVICES FOR CARTOGRAPHIC ALERTS

(75) Inventors: Darrin W. Kabel, Overland Park, KS (US); Steven J. Myers, Edgerton, KS (US)

(73) Assignee: Garmin Ltd. (KY)

( * ) Notice: Subject to any disclaimer, the term of this patent is extended or adjusted under 35 U.S.C. 154(b) by 71 days.

(21) Appl. No.: 10/667,026

(22) Filed: Sep. 18, 2003

(51) Int. Cl.

| | |
|---|---|
| ***B60L 3/00*** | (2006.01) |
| ***G06F 7/00*** | (2006.01) |
| ***G06F 17/10*** | (2006.01) |
| ***G08B 23/00*** | (2006.01) |

(52) U.S. Cl. ......................... 340/984; 701/21; 701/301

(58) Field of Classification Search ............ 340/686.6, 340/995.1, 984, 985, 851, 539.13, 539.2, 340/539.22, 7.56, 825.36, 961, 995.11, 850; 367/909, 87–116; 342/41, 357.13; 701/21, 701/201, 301, 211
See application file for complete search history.

(56) References Cited

U.S. PATENT DOCUMENTS 3,886,487 A * 5/1975 Walsh et al. .................. 367/92
4,323,992 A * 4/1982 Tobin, Jr. ................... 367/108
4,340,936 A * 7/1982 Mounce ...................... 701/200
4,646,244 A 2/1987 Bateman et al. ............ 364/461
4,873,676 A * 10/1989 Bailey et al. ................. 367/98
4,893,127 A * 1/1990 Clark et al. ................. 342/386
5,220,507 A 6/1993 Kirson
5,339,085 A 8/1994 Katoh et al. ................ 342/180
5,398,188 A 3/1995 Maruyama
5,470,233 A 11/1995 Fruchterman et al. ...... 434/112
5,543,789 A 8/1996 Behr et al.
5,559,707 A 9/1996 DeLorme et al.
5,592,382 A 1/1997 Colley ........................ 701/207
5,635,924 A 6/1997 Tran et al.
5,684,476 A 11/1997 Anderson ................... 340/988
5,872,526 A 2/1999 Tognazzini ................. 340/961
5,878,368 A 3/1999 DeGraaf
5,893,081 A 4/1999 Poppen (Continued)

FOREIGN PATENT DOCUMENTS

JP 2002-288800 A * 10/2002

OTHER PUBLICATIONS

C-Series Display Reference Manual, Raymarine UK, Mar. 2006.
GPSMAP 3600C/3010C Color Chartplotter, Garmin Ltd., 2004.
GPSMAP 206/2010 Chartplotters Owner's Manual and Reference Guide, Garmin Ltd., 2001.

*Primary Examiner*—Benjamin C. Lee
*Assistant Examiner*—Jennfier Mehmood
(74) *Attorney, Agent, or Firm*—David L. Terrell

(57) ABSTRACT

Systems, devices, and methods are provided for marine navigation and course calculation for avoiding preselected conditions. An electronic marine navigation device with marine course calculation capabilities includes a processor connected to a memory that includes cartographic data. A potential waypoint can be identified and a marine route calculation algorithm can be preformed to calculate a course between a first location and the potential waypoint in view of preselected conditions. Performing the marine route calculation algorithm includes analyzing the cartographic data for the area between the first location and the potential waypoint with a preference for providing a course that avoids preselected conditions. A display is connected to the processor and is capable of displaying the calculated course and cartographic data. The device is also adapted to dynamically analyze an area surrounding the first location for preselected conditions and display the results of the analysis.

50 Claims, 10 Drawing Sheets

Chart CA470075
N 48°25.853'
W123°15.754'
404
400
410
418
402
402
402
416
414
0.3nm
Card

U.S. PATENT DOCUMENTS

| | | | | |
|---|---|---|---|---|
| 5,999,882 | A | 12/1999 | Simpson et al. | 702/3 |
| 6,055,478 | A | 4/2000 | Heron | 701/213 |
| 6,061,629 | A | 5/2000 | Yano et al. | |
| 6,104,316 | A | 8/2000 | Behr et al. | |
| 6,198,428 | B1 | 3/2001 | Sekine | 342/176 |
| 6,199,015 | B1 | 3/2001 | Curtwright et al. | 701/213 |
| 6,279,851 | B1 | 8/2001 | Huss et al. | 244/3.15 |
| 6,289,277 | B1 | 9/2001 | Feyereisen et al. | |
| 6,314,370 | B1 | 11/2001 | Curtright | 701/213 |
| 6,356,837 | B1 | 3/2002 | Yokota et al. | 701/208 |
| 6,362,751 | B1 | 3/2002 | Upparapalli | |
| 6,981,538 | B2 | 4/2002 | Robinson et al. | |
| 6,385,538 | B1 | 5/2002 | Yokota | 701/211 |
| 6,401,038 | B2 | 6/2002 | Gia | 701/301 |
| 6,421,603 | B1 | 7/2002 | Pratt et al. | 701/206 |
| 6,469,664 | B1 | 10/2002 | Michaelson et al. | 342/357.13 |
| 6,473,003 | B2 * | 10/2002 | Horvath et al. | 340/945 |
| 6,556,206 | B1 | 4/2003 | Benson et al. | 345/473 |
| 6,574,551 | B1 | 6/2003 | Maxwell et al. | 701/209 |
| 6,577,947 | B1 | 6/2003 | Kronfeld et al. | |
| 6,653,947 | B2 | 11/2003 | Dwyer et al. | 340/970 |
| 6,654,689 | B1 | 11/2003 | Kelly | |
| 6,665,630 | B2 | 12/2003 | Wei et al. | 702/155 |
| 6,734,808 | B1 * | 5/2004 | Michaelson et al. | 340/984 |
| 6,750,815 | B2 | 6/2004 | Michaelson et al. | 342/357.13 |
| 6,845,324 | B2 | 1/2005 | Smith | |
| 6,862,501 | B2 | 3/2005 | He | 701/3 |
| 6,885,919 | B1 * | 4/2005 | Wyant et al. | 701/21 |
| 7,035,166 | B2 | 4/2006 | Zimmerman et al. | 367/88 |
| 2002/0121989 | A1 | 9/2002 | Burns | |
| 2004/0003958 | A1 * | 1/2004 | Fujimoto et al. | 181/124 |
| 2004/0006423 | A1 * | 1/2004 | Fujimoto et al. | 701/201 |

* cited by examiner

METHODS, SYSTEMS, AND DEVICES FOR CARTOGRAPHIC ALERTS

FIELD OF THE INVENTION

The present invention relates generally to navigational devices, and in particular to marine navigational devices with cartographic alert capabilities.

BACKGROUND OF THE INVENTION

Boating is an activity enjoyed by many people. Safe boating, however, requires common sense and the ability to remain alert to the prevailing boating conditions. A variety of equipment is available to boaters to aid them in these endeavors. For example, boats can be equipped with radios, radar systems, cameras, and sensors for providing a variety of information to the boater. The boater can then use the information from these devices in planning and navigating a course for the boat.

Many times, however, there can be quite a lot of information for the boater to consider in planning and navigating a course for the boat. For example, which courses might be preferable, or even available, for the size and type of boat being used. In addition, a user may inadvertently overlook one or more hazards in planning their course.

DETAILED DESCRIPTION OF THE INVENTION

Embodiments of the present invention include marine navigational methods, systems, and devices having course calculation and analysis capabilities. The marine navigational methods, systems, and devices can use any number of devices for determining one or more positions. For example, the marine navigational device can include devices for receiving signals (e.g., radio signals) from which positional triangulation can be performed to determine the one or more positions. In additional embodiments, a global positioning system (GPS) enabled marine navigational device can be used for determining one or more positions. Such GPS systems are known and have a variety of uses.

Although the term marine navigation is used in the present application, one of ordinary skill in the art will appreciate from reading the disclosure that the techniques described herein could equally be applied for use in non-street based navigation. So, the use of the word "marine" in the embodiments of the present invention (including the claims) could be replaced with the phrase "non-street based", where non-street based can include a navigational method, system, and devices that do not necessarily rely on one or more roads, highways, streets, and/or freeways in providing navigational methods, systems and/or devices.

In general, GPS is a satellite-based radio navigation system capable of determining continuous position, velocity, time, and in some instances direction information for an unlimited number of users. GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
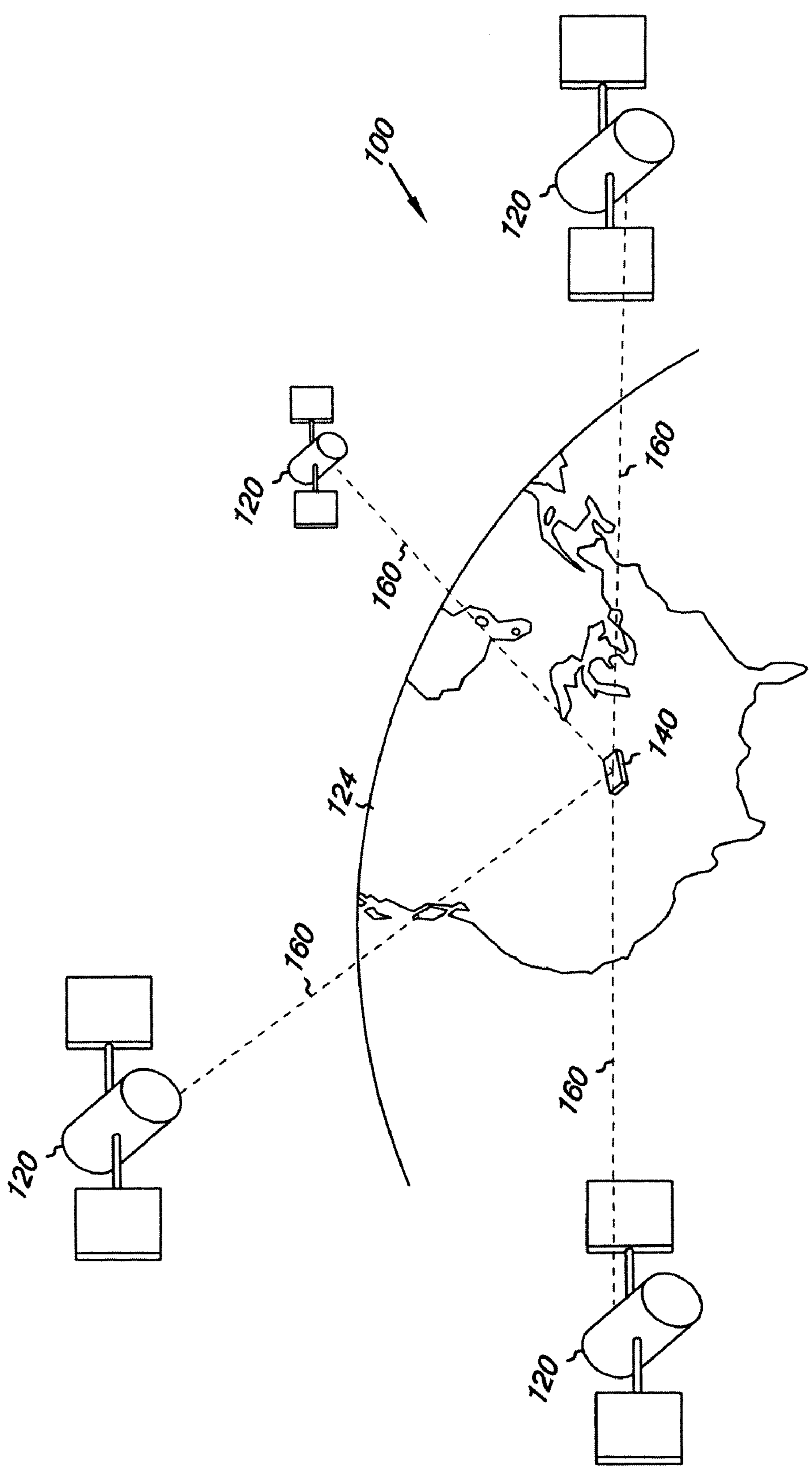
FIG. 1 is a representative view of a Global Positioning System (GPS)

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present embodiment is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
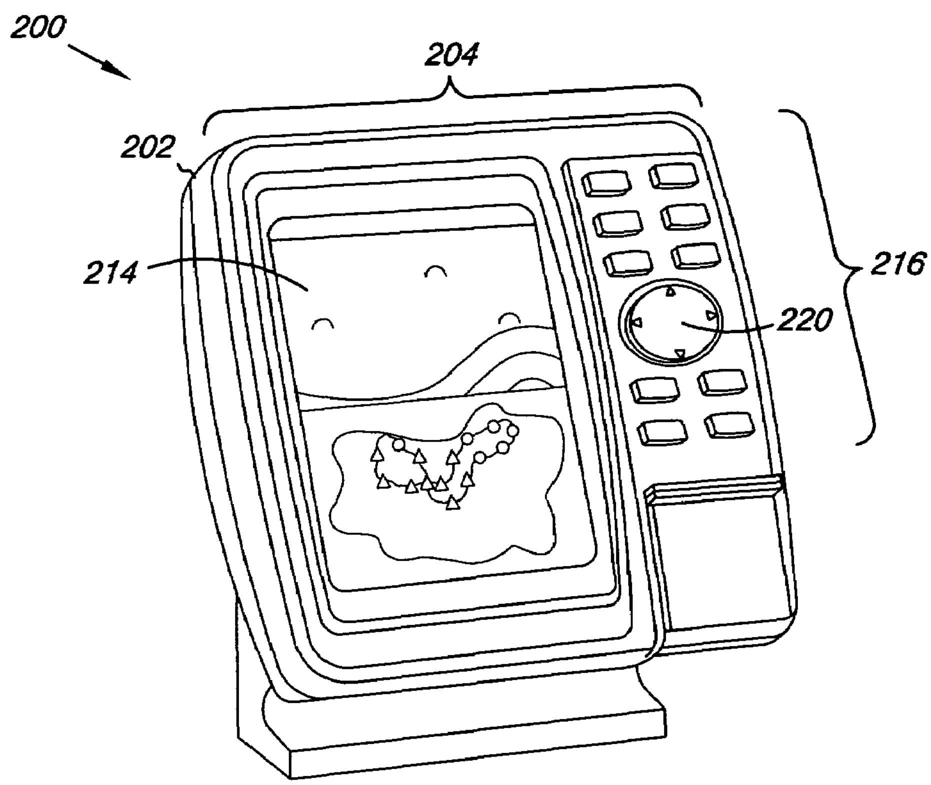
FIGS. 2A and 2B illustrate views for one embodiment of an electronic marine navigational device.
Figure 2B:
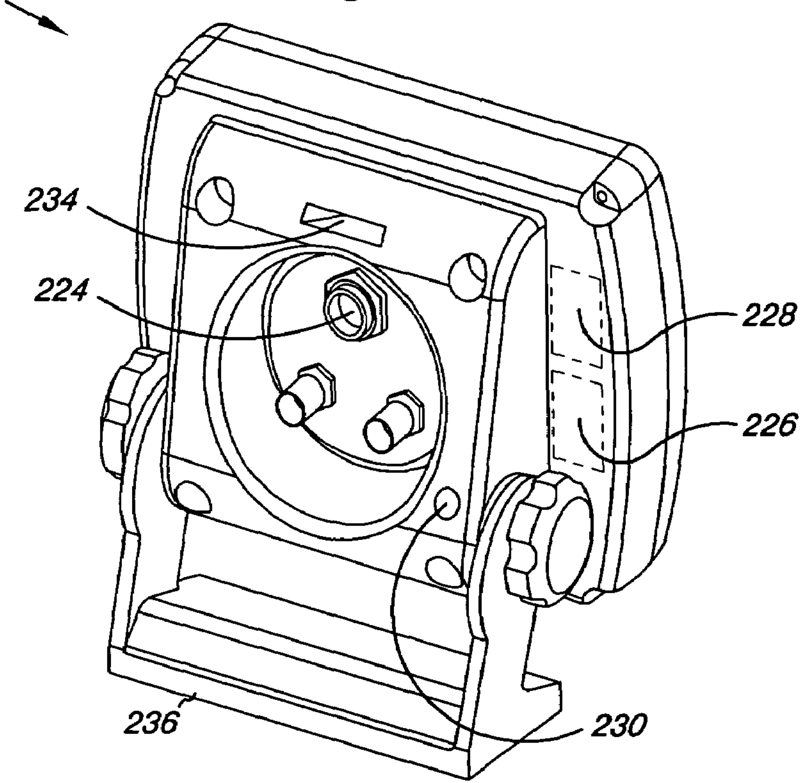

FIGS. 2A and 2B illustrate views for one embodiment of an electronic marine navigational device 200. Device 200 can be portable and can be utilized in any number of implementations besides marine application. For example, device 200 could possibly be used in an automobile and in avionic navigation.

FIG. 2A illustrates a front view of marine navigational device 200. Marine navigational device 200 can include a housing 202. In the various embodiments, housing 202 includes a fully gasketed, high-impact strength plastic or plastic/alloy, waterproof case and has been rounded for aesthetic and ergonomic purposes. This is but one example, and other protective housings 202 (e.g., metal or metal alloy) are possible.

Marine navigational device 200 further includes a control panel 204 that includes a display screen 214. For example, display screen 214 can be a color LCD display which is capable of displaying both text and graphical information. The invention, however, is not so limited. Audio information can likewise be provided. In addition, marine navigational device 200 can further include two-way voice communication capabilities (e.g., two-way radio or cellular communication) and capabilities for receiving National Oceanic and Atmospheric Administration (NOAA) weather broadcasts.

Display screen 214 is operable to present a number of different screen displays, examples of which are provided herein. The number of different screen displays includes, but are not limited to, a map display, including a split-screen moving map, a radio display, including, for example, channel selection and squelch code settings; location lookup for use with downloaded cartographic data, including marine craft data, of a map; a navigation display, including, for example, graphic compass, distance to destination, speed, and time of arrival prediction; point of interest display; listing of location display; trip computer display, including, for example, trip distance, average and maximum speeds, travel time, and location; and waypoint display for setting waypoints or locations.

Display 214 illustrates an embodiment of a map display. As will be explained in more detail below, in the various embodiments of the present invention, electronic marine navigational device 200 includes a basemap operable to show lakes, rivers, channels, lock and dams, buoys (e.g., marine buoys, navigation buoys, mooring buoys), channel markers, ports, docks, land, underwater obstacles, land, water depth, rock(s), sandbars, shelves, tidal conditions, tidal data, above-water obstacles (e.g., bridges), type of water bottom, and prohibited areas, cities, highways, streets, counties boundaries, and state boundaries on display 214. In one embodiment, the basemap can be built-in. In an additional embodiment, the basemap can be transferred to and/or provided on a removable data card to the device 200.

As further shown in FIG. 2A, marine navigational device 200 further includes a number of input devices 216 such as a power on/off button, display zoom control buttons, menu selection button, user confirmation key, and the like. The input devices 216 shown in FIG. 2A also include a multi-position (e.g., 3-axis) data entry button 220 for use with the display screen 214. The display 214 can also receive data through a touch sensitive screen (e.g., screen can be responsive to use of a stylus and/or finger touch).

FIG. 2B illustrates a rear view for an embodiment of the electronic marine navigational device 200. The electronic marine navigational device 200 includes a data port 224 operable to upload and download data between the electronic marine navigational device 200 and another electronic device, such as by using a USB connector, Ethernet, or other suitable connection. In some embodiments, as will be discussed below, data can be uploaded and downloaded to the electronic marine navigational device 200 using a transceiver in the device 200 which can accommodate a wireless transmission medium such as, for example, infrared, Bluetooth, and/or Radio Frequency (RF) signals. Other transmission medium might also be used. In the various embodiments of the present invention and as will be explained further herein, the data port is operable to upload and download device 200 software, marine craft data, and/or other cartographic data. Marine navigational device 200 can also include at least one antenna, including GPS antenna 226 coupled to an integrated GPS receiver, and voice data antenna 228 coupled to an integrated communication transceiver. Device 200 can further include input ports for externally mounted antennas for GPS receiver and/or for the communication transceiver.

The marine navigational device 200 can includes an electrical power input port 230 for coupling to an external power supply. The invention, however, is not so limited. For example, a battery power supply could be operatively coupled to device 200 to power its electronic components. Likewise, the various embodiments can include an electronic device having a data card slot, or data card port 234. The marine navigational device 200 can further include a mounting bracket 236 so that device 200 can be selectably and removably mounted on a removable clip and/or surface.

The illustrations shown in FIGS. 2A and 2B are but one example of a hardware configuration for a marine navigational device according to the teachings of the present invention. However, the invention is not limited to the configuration shown in FIGS. 2A and 2B. Other suitable designs for a hardware device which can accommodate the present invention are also possible.

Figure 3:
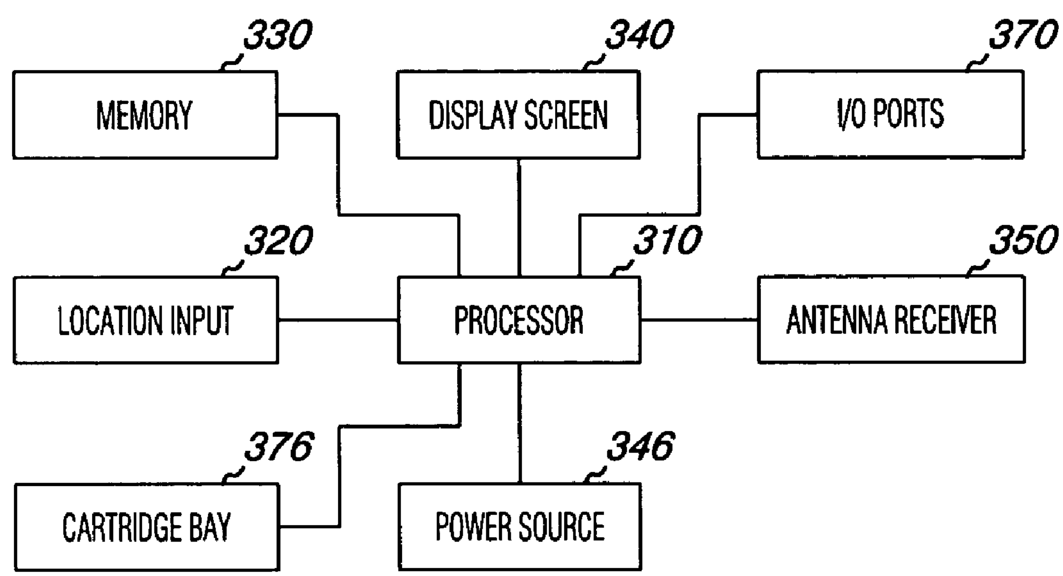
FIG. 3 is a block diagram of one embodiment for the electronic components within the hardware of FIGS. 2A-2B.

FIG. 3 illustrates one embodiment of a block diagram for the electronic components within the hardware of FIGS. 2A-2B, such as within housing 202 and utilized by the electronic marine navigational device. The electronic components of the electronic device can include a processor 310 that is operatively coupled to a location input 320, such as input devices 216 (e.g., data entry button 220). Processor 310 can also be operatively coupled with memory 330 and display screen 340. It will be understood that input 320 may additionally include a microphone for receiving voice commands and/or an input from display screen 340 (e.g., touch sensitive screen). The electronic components further include a power source input 346 for powering the electronic components of the marine navigational device.

Memory 330 can retrievably store instructions for executing one or more executable programs according to the present invention. For example, the memory 330 can retrievably store a marine route calculation algorithm, as discussed herein, of the present invention. In addition, memory 330 can further retrievably store cartographic data, including marine craft data and a variety of preselected conditions that are also used in conjunction with the marine route calculation algorithm. Preselected conditions can include user identified parameters, and any values associated with the parameters, that are associated with geographical conditions of particular interest. For example, preselected conditions a user can select include, but are not limited to, indications of land, water depth, rock(s), sandbars, shelves, tide condition, tidal data, wind conditions, weather conditions, ice, above-water obstacles (e.g., bridges), underwater obstacles (e.g., submerged wrecks), type of water bottom, and prohibited areas, to name only a few. The preselected conditions, and their associated values, can be selected and programmed by a user through, for example, controlling one or more input menus on display screen 340 with the location input 320.

The location input 320 can also receive additional cartographic data, including marine craft data, through the input devices 216 (e.g., data entry button 220) and/or the display screen 340 from a user. This additional cartographic data, including marine craft data, can include a first location, such as a present location or a waypoint location, or other waypoint locations, such as a destination location, that can be used in calculating and/or analyzing a course for a marine craft. In one embodiment, the present location can be up-dated at a preselected rate in real-time. In addition, the location input 320 can further receive coordinate positions for the waypoints (e.g., a potential waypoint). The location input 320 can also receive the coordinate positions for waypoints by inputs through the display 340. In one example, the coordinate positions can be longitude and latitude coordinate positions.

Embodiments of the present invention also allow for a course to be analyzed between the first location and one or more waypoints, where cartographic data, including marine craft data, for the area between the first location and the waypoints can be analyzed to determine whether preselected conditions are present along the course. So, for example, a user may want to have a course analyzed between a first location and a potential waypoint that is separate from the first location. In the present example, the first location can be a present location of the device in which the coordinates of the present location can be entered by the user or determined based on a signal from a global positioning system, or other signal triangulation system. In an additional embodiment, the first location can be set as a waypoint location separate from the potential waypoint, in which the waypoint location will not change during the calculation of the course between the first location and the potential waypoint. In a further embodiment, the potential waypoint can identify a waypoint location that may be changed by the user, for example, based on the outcome of the course calculated between the first location and the potential waypoint. In other words, the potential waypoint may be moved so as to have alternative courses calculated and/or analyzed between the first location and the potential waypoint.

In addition, the processor 310 further operates on the marine route calculation algorithm to analyze a course between the first location and the potential waypoint in view of preselected conditions of the cartographic data, including the marine craft data. So, for example, the processor 310 can operate on the route calculating algorithm to analyze the cartographic data, including the marine craft data, to identify and avoid preselected conditions in the course being calculated between the first location and the potential waypoint.

The course analyzed with the marine route calculation algorithm can also analyze a predetermined distance on either side of the calculated course for preselected conditions. In other words, a buffer zone around the calculated course can be analyzed for preselected conditions. In one embodiment, the predetermined distance to be analyzed can be automatically determined by the marine route calculation algorithm based on the type of marine craft that is being used. The predetermined distance can also be determined and programmed into the device by the user. The size of the predetermined distance can be influenced by any number of factors, including, but not limited to, the size (e.g., width), the maneuverability, and/or the steering characteristics of the marine craft.

In a situation where the processor 310 operating on the marine route calculation algorithm identifies one or more preselected conditions in analyzing the course, the processor 310 operates on the route calculating algorithm to re-route the course to avoid the preselected conditions. In one embodiment, in routing and/or re-routing the course to avoid the preselected conditions, the processor operates on the route calculating algorithm to identify one or more non-user waypoints between the first location and the potential waypoint.

Figure 4A:
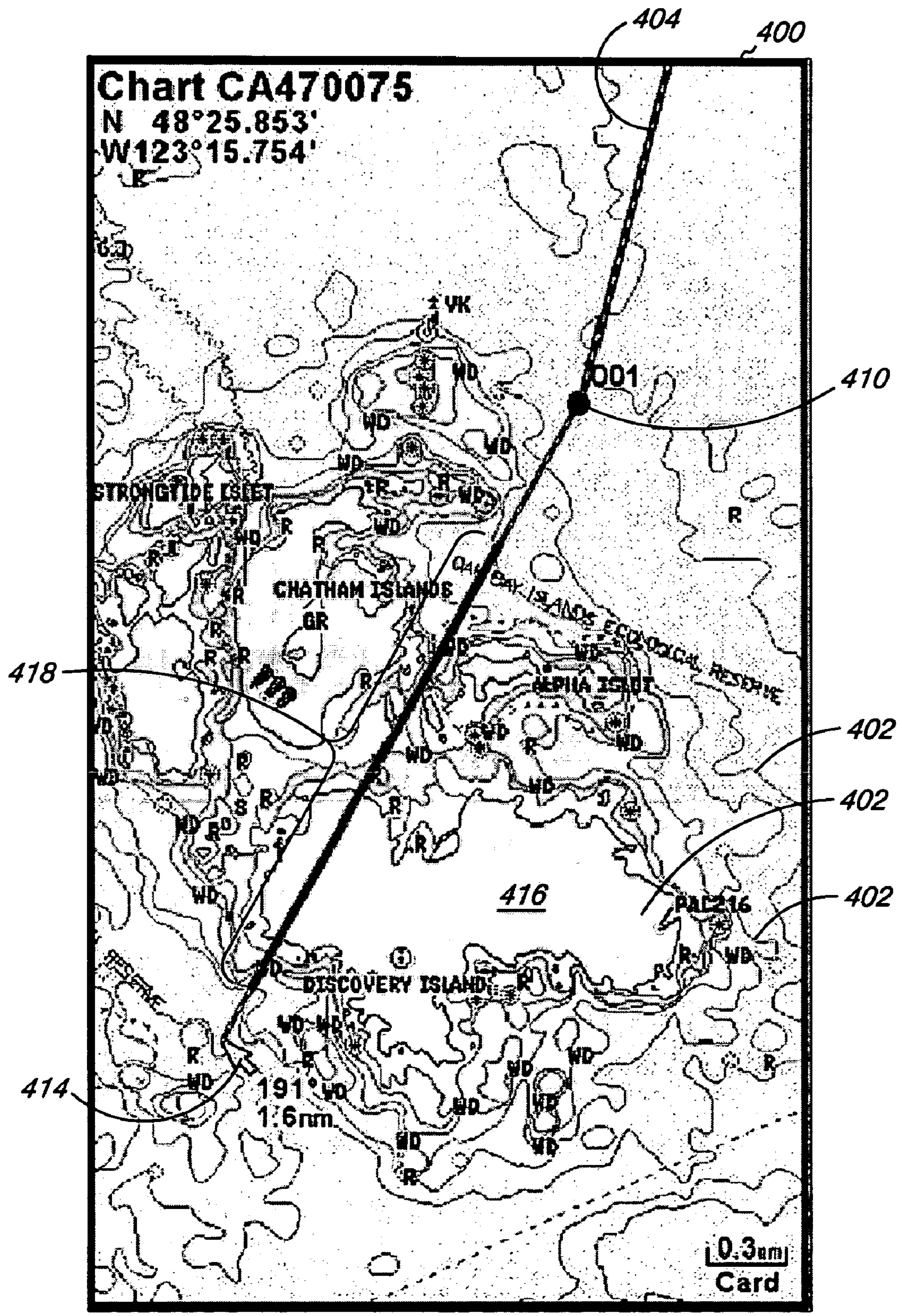
FIGS. 4A-4E illustrate a number of display screen embodiments which are operable with the electronic marine navigational device of the present invention.
Figure 4B:
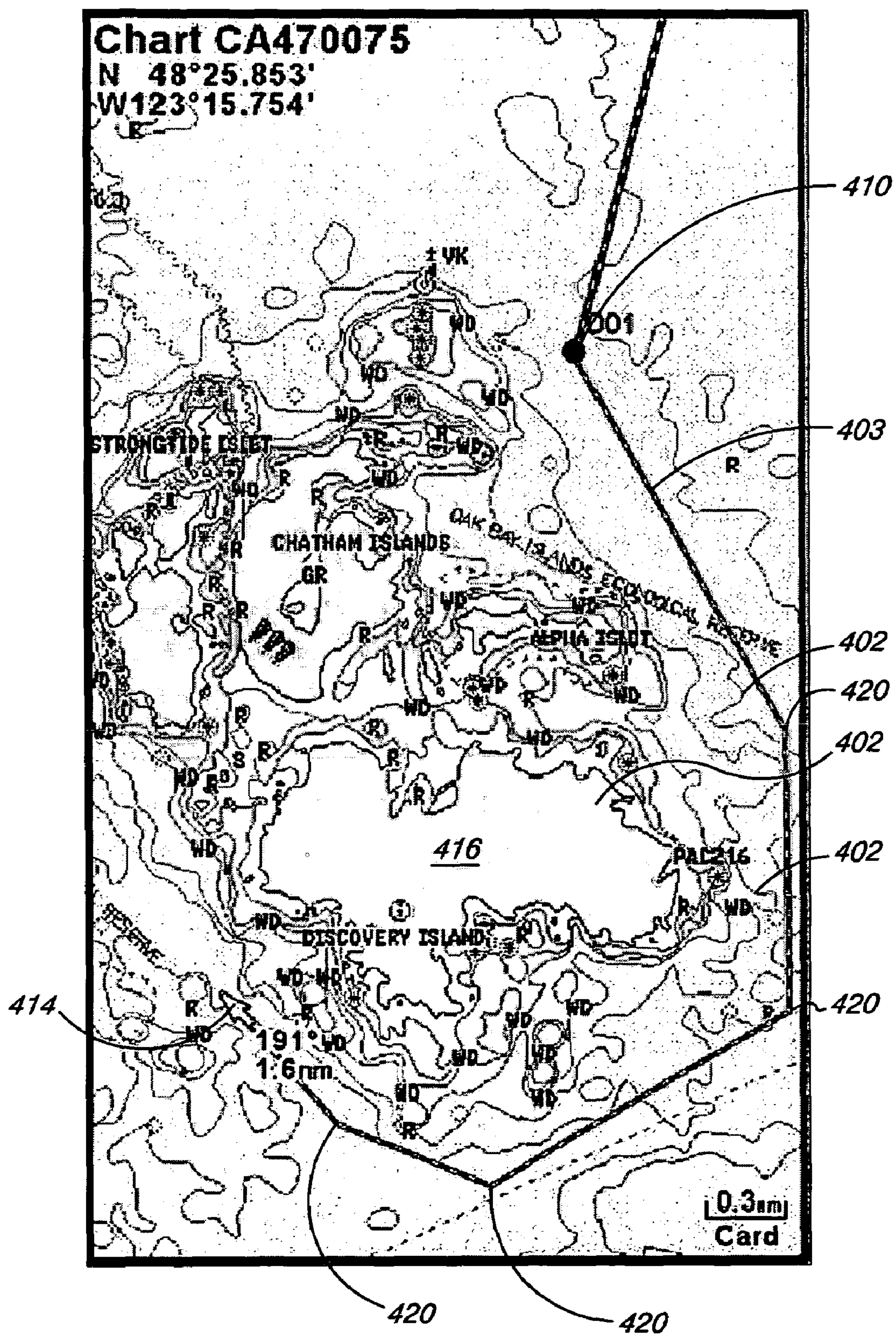
Figure 4C:
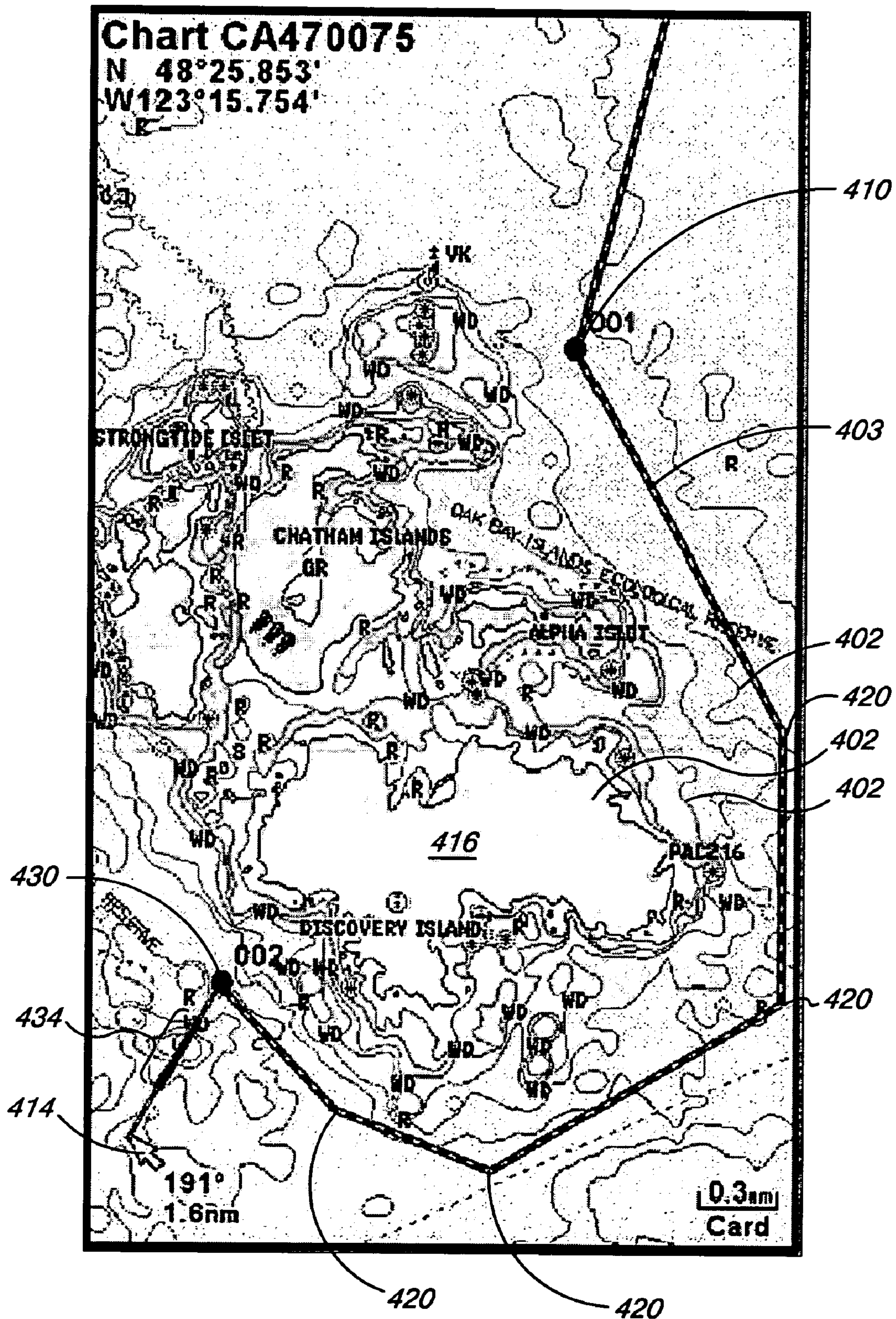
Figure 4D:
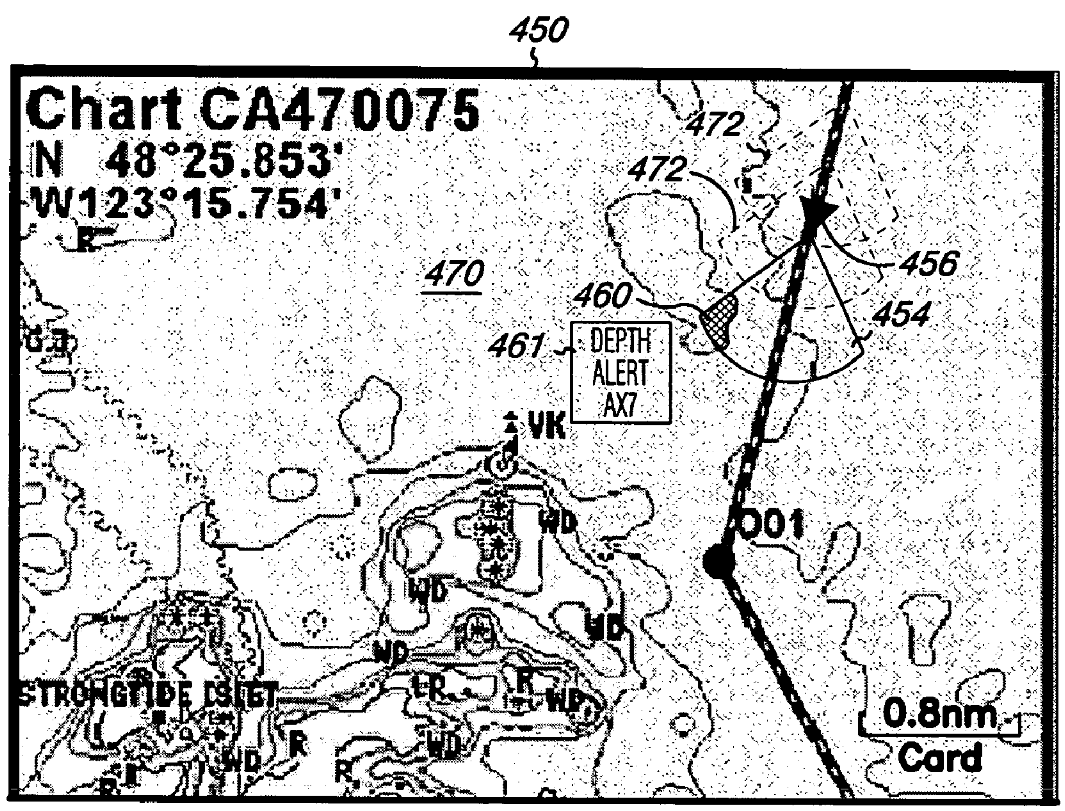
Figure 4E:
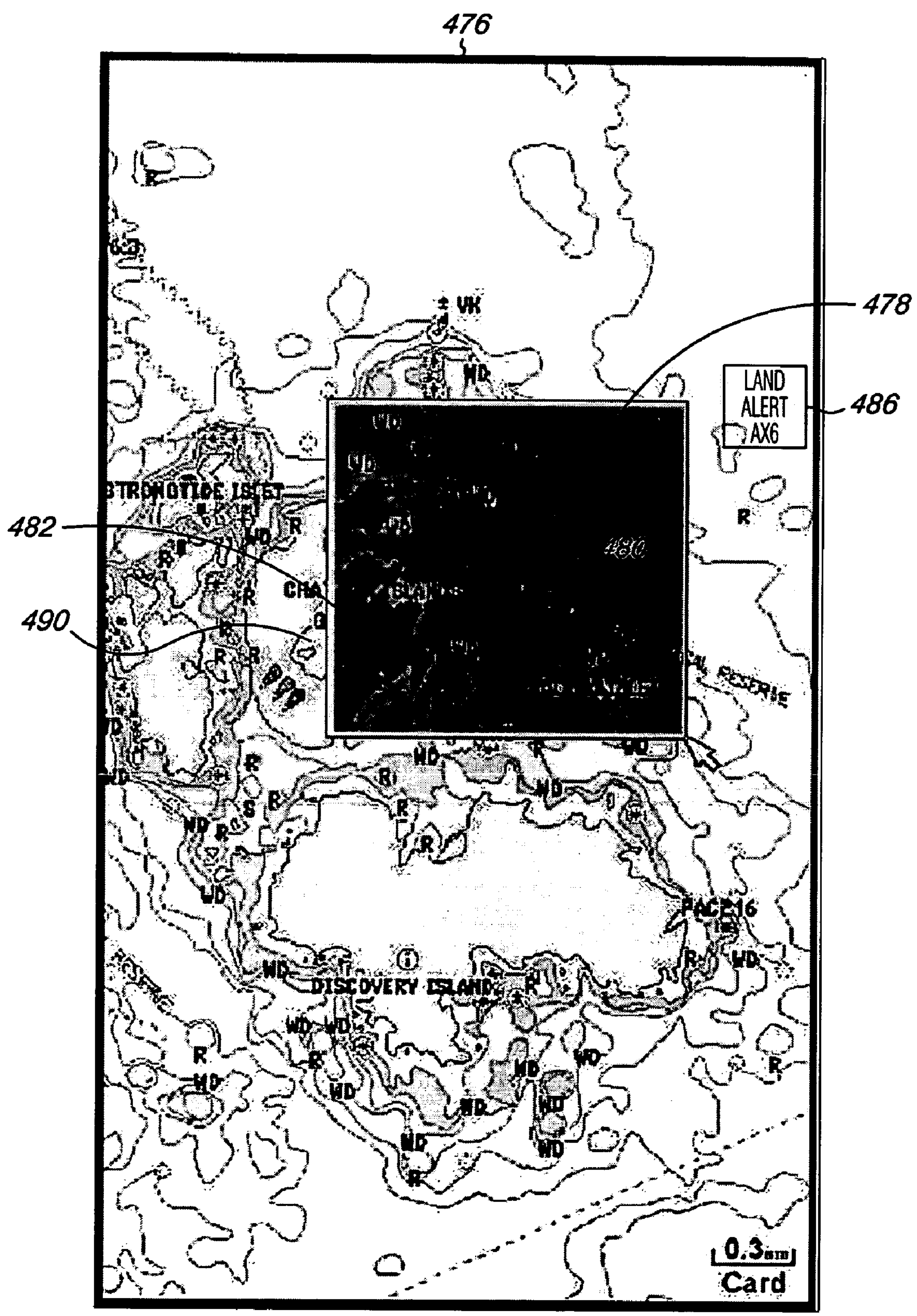

The marine route calculation algorithm can also be used to analyze cartographic data within a user defined graphical filter area (shown as 478 in FIG. 4E). In one embodiment, the user defined graphical filter area includes a geographical area defined by a user on the display screen 340. Examples of defining the user defined graphical filter area on the display screen 340 include, but are not limited to, use of the input devices 216 or the display screen 340 itself. For example, a user could draw the user defined graphical filter area using a cursor shown on the display screen 340. The user defined graphical filter area can include an area smaller than the display screen 340.

The user defined graphical filter area can also include any number of shapes, including, but not limited to, square, rectangular, triangular, or circular. Other shapes for the user defined graphical filter area are also possible. The user defined graphical filter area can further be positioned and/or repositioned over any number of locations on the display screen 340. In one embodiment, a displayed cursor under the control of one or more of the input devices 216 can be used to position and/or reposition the user defined graphical filter area over any number of locations on the display screen 340.

The processor 310 can operate on the marine route calculation algorithm to analyze cartographic data within the user defined graphical filter area for preselected conditions. For example, the processor 310 can operate on the marine route calculation algorithm to analyze cartographic data within the defined graphical filter area selected and positioned, or repositioned, by the user for preselected conditions. In an additional example, the processor 310 can dynamically analyze the cartographic data within the defined graphical filter area for preselected conditions as the area is being position and/or repositioned. So, for example, the processor 310 dynamically analyzes the cartographic data within the defined graphical filter area for preselected conditions when repositioning the graphical filter area from a first position to a second position.

In one example, the dynamic analysis of cartographic data, including the marine craft data, within the defined graphical filter area for preselected conditions allows for a user to be aware of preselected conditions that may be located within the area, but not necessarily at the first location and/or along the course which the device is traveling. In an additional embodiment, analyzing the cartographic data within the defined graphical filter area can be available regardless of whether a calculated course is being used or not. In other words, a user need not have a destination point, one or more waypoints (e.g., a potential, or other waypoint) and/or a calculated a course to have the cartographic data analyzed within the defined graphical filter area.

An antenna/receiver 350, such as a GPS antenna/receiver is operatively coupled to processor 310. It will be understood that the antenna and receiver, designated by reference numeral 350, are combined schematically for illustration, but that the antenna and receiver may be separately located components, and that the antenna may be a GPS patch antenna or a helical antenna. The electronic components further include I/O ports 370 operatively connected to processor 310. In addition, the electronic components can further include a cartridge bay 376 operatively coupled to the processor 310 for receiving cartographic data, including marine craft data, from a map data cartridge.

Using antenna/receiver 350 as a GPS, processor 310 can determine the first location, for example, as being a present location of the device on a course based on the signals received from the GPS. Processor 310 can dynamically analyze cartographic data, including the marine craft data, for a predetermined area around the first location, in this situation the present location, for preselected conditions. The area around the first location for analysis can have a preselected size and shape relative to the first location. In addition, the area to be analyzed can be refreshed at a preselected rate so as to ensure that the first location does not move out of the analyzed area prior to the analysis being refreshed.

In one example, the dynamic analysis of cartographic data, including the marine craft data, around the first location for preselected conditions allows for a user to be aware of preselected conditions that may be in the vicinity, but not necessarily at the first location and/or along the course which the device is traveling. In this way, the user will better understand the nature of the area surrounding the first location and/or the calculated course with respect to the preselected conditions. Analyzing the cartographic data around the first location can also be available regardless of whether a calculated course is being used or not. In other words, a user need not have a destination point, one or more waypoints (e.g., a potential, or other waypoint) and/or a calculated course to have the cartographic data analyzed for the predetermined area around the first location.

In a further embodiment, the analysis of the present invention also need not be used in conjunction with calculating a course, but rather can be used to analyze the cartographic data in the area between the first location and the potential waypoint. In this way a user can better understand what predetermined conditions exist between the first location and the potential waypoint without having to calculate a course. In an additional embodiment, the analysis of the present invention also can be used in conjunction with calculating a course that includes the first location and the potential waypoint.

The area to be dynamically analyzed can also have a preselected size and shape relative to the present location. Examples of the preselected shape include, but are not limited to, a triangular or a sector of a circle shape. In one embodiment, the size of the area can be defined by radii extending along the course from the first location (e.g., a present location), such as a heading determined through the use of a track log. In addition, the size of the predetermined area can be determined based on a number of factors, including, but not limited to, the speed and heading of the electronic marine navigational device. In an additional embodiment, an angle of the analyzed area emanating from the first location can be either set by the user or determined based on type and nature of the marine craft in which the device is being utilized (e.g., a large craft with a large turn radius may require a larger angle of analysis as compared to a smaller more maneuverable craft having a smaller turn radius). In an additional embodiment, the area can encircle the first location, where a radius of the area analyzed can be a function of the speed and heading of the electronic marine navigational device. Any number of shapes could be used for the area to be analyzed, where the area could be selected based on the application of the analysis.

The device of the present invention can also include one or more ways of providing an alert signal to the user of the device when a preselected condition is encountered during the analysis. In one embodiment, processor 310 provides the alert signal when the analyzed cartographic data, including the marine craft data, for the course and/or the predetermined area around the first location includes preselected conditions. So, processor 310 would provide the alert signal when the analyzed cartographic data, including the marine craft data, for the user defined graphical filter area and/or between the first location and the potential waypoint included preselected conditions. The device can further include an audio output device 380 operatively coupled to processor 310 to audibly present the alert signal. For example, the device can include a speaker, including associated amplifiers and circuitry, for providing the audio alert signal. The alert signal can also be graphically presented on display 340 under the control of processor 310. Examples of graphically presenting the alert signal can include, but are not limited to, highlighting the analyzed course and/or the analyzed area that includes the preselected condition. This highlighting can include, but it not limited to, causing a change in the display color for the analyzed course (e.g., changing the plotted course color from black to red, changing from a solid line to a broken or dashed line, or causing a line of the plotted course to flash on and off) or the analyzed area (e.g., stippling the area, or portion of the analyzed area that contains the preselected condition). In addition, the alert signal can also include text displayed on display 340 that indicates the preselected conditions encountered in analyzing the course and, optionally, indicators of their approximate locations along the course.

Different configurations of the components shown in FIG. 3 are considered within the scope of the embodiments of the present invention.

Software embodiments of the present invention provide a device which is capable of analyzing a course between a first location and a potential waypoint or dynamically analyzing an area for preselected conditions. Embodiments of the device can also re-route to avoid the preselected condition between a first location and a potential waypoint, as discussed herein. The device can incorporate these and other functions as will be explained in more detail below in connection with FIGS. 4, 5, 6, and 7.

FIGS. 4A-4E, illustrate a number of display screen embodiments which are operable with various embodiments of the present invention. That is, software embodiments are operable to present data and provide various user interfaces on a display, such as those described herein.

For example, FIG. 4A provides a map display 400 showing cartographic data 402, including the marine craft data, which includes, but is not limited to, water depth, land, geographical boundaries, rivers, navigational aides (e.g., landmarks), lakes, channels, lock and dams, buoys (e.g., marine buoys, navigation buoys, mooring buoys), channel markers, ports, docks, land, underwater structures (e.g., wrecks and obstructions), weather, and the like. In various embodiments, the displays of the present invention can be accessed and displayed using selectable menus shown on a display screen and/or through use of input devices on the device. As shown, map display 400 can include a portion of a course 404 along with cartographic data 402, including the marine craft data, such as rivers, lakes, topographic data, and county and state boarders, to name only a few.

FIG. 4A illustrates course 404 between a first location 410 and a potential waypoint 414 that passes through land 416. In the present embodiment, the first location 410 is shown as a first waypoint that has been selected by a user. As described herein, land can be classified as a preselected condition. As such, course 404 has been highlighted to indicate that at least one preselected condition has been identified in the analysis of course 404. Highlighting in the instant case is provided by a bolding of the line representative course 404 in a region 418. At this point, the device can calculate one or more possible courses around the preselected condition.

FIG. 4B provides map display 400 having course 403 recalculated to avoid the one or more preselected conditions (e.g., avoid the land in region 418 of the previous course 404). Recalculating of course 403 relative to the original calculation of course 404 shown in FIG. 4A provides the recalculated course 403 with one or more additional waypoints, shown as 420. The additional waypoints 420 have been included to allow the course 403 to avoid the preselected conditions. The waypoints 420, in the present situation, are non-user waypoints. In other words, waypoints 420 were determined by the system, and not the user. Embodiments however are not so limited. In an additional embodiment, the user can indicate waypoints to be used and/or alter waypoints that are provided by the system.

The user can also request a subsequent recalculation of course 403 between the first location 410 and the potential waypoint 414. In one embodiment, this request could be made through a menu displayed on the display screen of the device. Other mechanisms for requesting the recalculation of course 404 are also possible. Additionally, in the situation where the user does not like the recalculated course 403, the user can reposition the potential waypoint 414 to a new location and allow a course between the new location and the first location 410 to be analyzed.

FIG. 4C provides map display 400 having recalculated course 403. In FIG. 4C, the potential waypoint (414 of FIGS. 4A and 4B) has now been designated by the user to be a second location 430. The user can select a new potential waypoint 414 so that an additional portion of course 404 can be analyzed. In the embodiment shown in FIG. 4C, another preselected condition has been identified between the second location 430 and the potential waypoint 414. As such, a new portion of the course between 430 and 414 has been highlighted to indicate that at least one preselected condition has been identified in this portion of the course 403. Highlighting in the instant case is provided by a bolding of the line representative course 403 in a region 434. At this point, the device can once again calculate one or more possible courses around the preselected condition.

FIG. 4D provides an additional embodiment of a map display 450, where cartographic data, including the marine craft data, is dynamically analyzed for preselected conditions in a predetermined area 454 around the first location 456. In the present embodiment, the first location 456 includes the present location of the device as determined using a GPS signal or other triangulation signals. In the embodiment shown in FIG. 4D, the cartographic data, including the marine craft data, of the predetermined area 454 is dynamically analyzed for preselected conditions. In the present example, an alert signal 460 for at least one preselected condition within the predetermined area 454 is shown in FIG. 4D.

In the present embodiment, the alert signal 460 is provided as a highlighted area that contains the one or more preselected conditions. In addition, one or more text messages may be associated with and displayed on display 470. For example, the one or more text messages may be automatically displayed on the display 470. The user may also interact with the marine device to request further information regarding the alert signal 460. When more than one alert signal is present on a display, each alert signal can be identified by a unique designator (e.g., "AX7") for which the user can request additional information.

The predetermined area 454 to be analyzed can be refreshed at a preselected rate so as to ensure that the first location 456 does not move out of the current analyzed area (e.g., area 454) prior to the analysis being refreshed. In one embodiment, the present speed, average speed, potential top speed, and heading of the marine craft can all be used in determining a refresh rate for analyzing subsequent predetermined area to ensure that the marine craft does not move out of the predetermined area 454 prior to the analysis being refreshed. FIG. 4D also shows examples of previously analyzed areas 472, shown with, for example, broken lines. Other ways of representing the previously analyzed areas 472 are also possible, including not showing the previously analyzed areas.

In an additional embodiment, the device can further, optionally, provide alternative visual alerts to the encountered preselected conditions, audio to present the alert signal, and/or text messages displayed on the display that indicates the preselected conditions encountered in calculating the course and, optionally, indicators of their approximate locations along the course.

FIG. 4E provides an additional embodiment of a map display 476, where cartographic data, including the marine craft data, can be dynamically analyzed for preselected conditions in a user defined graphical filter area 478. The size and shape of the user defined graphical filter area 478 can be selected by a user. In the embodiment shown in FIG. 4E, the user defined graphical filter area 478 is shown positioned over both water 480 and at least one preselected condition (e.g., land 482). The user defined graphical filter area 478 provides a visually defined area that a user can, for example, position at one or more locations, including being dragged over, the map display 476 so as to identify the location of preselected conditions.

In the present example, an alert signal 486 for at least one preselected condition within the user defined graphical filter area 478 is shown in FIG. 4E, in which the land 482 within the user defined graphical filter area 478 has a first color (e.g., black) that is different than a second color (e.g., grey) of land 490 outside of the user defined graphical filter area 478. One or more text messages may be associated with and displayed on display 476. Other visual and/or audio alerts to the encountered preselected conditions may also be used in conjunction with, or for, the alert signal 486 for at least one preselected condition within the user defined graphical filter area 478 in FIG. 4E.

Embodiments of the present invention include software, application modules, and computer executable instructions operable on the devices and systems described herein. The embodiments, however, are not limited to any particular operating environment. Nor is the software limited to software written in a particular programming language. Thus, the invention includes a set of instructions executable by an information handling system to produce the embodiments described herein. That is, the software can reside on a free standing device as shown in FIGS. 2A and 2B and/or can, in some embodiments, be loaded, stored, and reside on a data cartridge.

Figure 5:
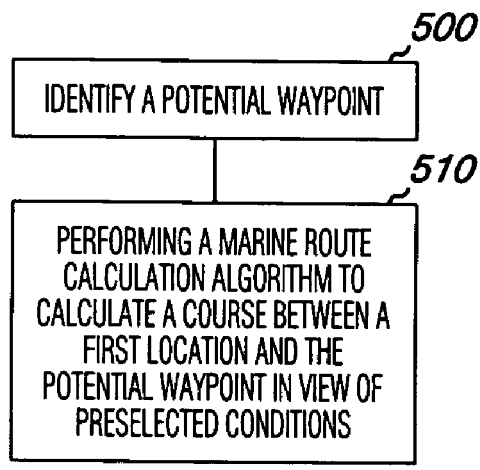
FIGS. 5-7 are flow charts illustrating various method embodiments.
Figure 6:
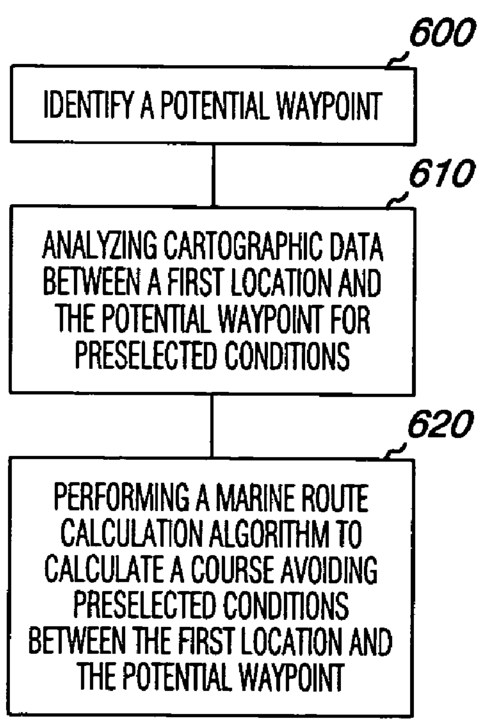
Figure 7:
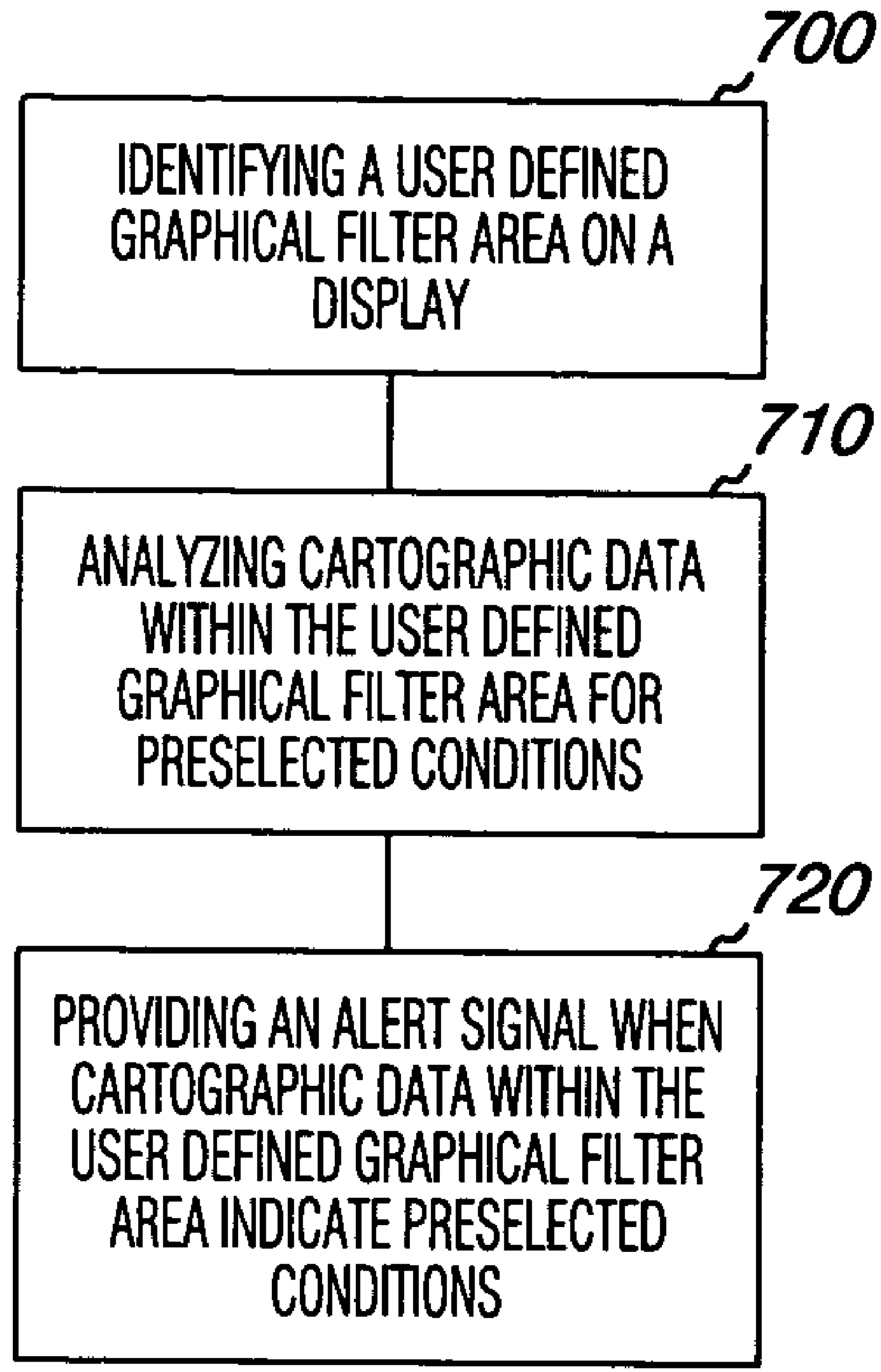

FIGS. 5-7 are flow charts illustrating various method embodiments of the invention. As one of ordinary skill in the art will understand, the methods can be performed by software, application modules, and computer executable instructions operable on the systems and devices shown herein or otherwise. The invention, however, is not limited to any particular operating environment or to software written in a particular programming language.

FIG. 5 is a flow chart illustrating one method according to an embodiment of the present invention. It should be understood by those of ordinary skill in the art that one or more of the methods provided herein may be executed in a different order than that described herein. That is, elements of each method claim do not need to be executed in the order shown unless it is stated herein that such order is explicitly required.

As shown in FIG. 5, a method for marine navigation is provided. The method includes identifying a potential waypoint, 500. In the various embodiments, identifying the potential waypoint can be accomplished by identifying the potential waypoint on or through a display, as discussed herein. At 510, a marine route calculation algorithm can be performed to analyze a course between a first location and the potential waypoint in view of preselected conditions. The first location can include, but is not limited to, a first waypoint, as may be selected by a user, or a present location, as may be determined by a GPS or other triangulation signals. So, for example, a course could be analyzed between the present location (i.e., the first location in this example is the present location) and the potential waypoint. In an additional example, a course could by analyzed between a first waypoint (i.e., the first location in this example is the first waypoint as set by a user) and the potential waypoint.

Performing the marine route calculation algorithm can include analyzing cartographic data, including the marine craft data that includes preselected conditions between the first location and the potential waypoint. The course analysis is performed to avoid the preselected conditions. One approach to avoiding the preselected conditions includes routing and/or re-routing the course to avoid the preselected conditions when the marine route calculation algorithm identifies one or more preselected conditions between the first location and the potential waypoint.

In re-routing the course calculated by the marine route calculation algorithm, the algorithm can further include identifying one or more non-user waypoints between the first location and the potential waypoint. These non-user waypoints represent the waypoints identified by the device in re-routing the course. Alert signals can be provided to the user when the analyzed cartographic data, including the marine craft data, between the first location and the potential waypoint includes preselected conditions. Providing the alert signal can include displaying a visual alert and/or emitting an audio alert. Other alert signals are also possible, such as, for example, a mechanical alert (e.g., vibration of the device).

FIG. 6 is a flow chart illustrating an additional method according to an embodiment of the present invention. As shown in FIG. 6, a method for marine navigation is provided. The method includes identifying a potential waypoint at 600. In the various embodiments, identifying the potential waypoint can be accomplished by identifying the potential waypoint on or through a display. Cartographic data, including the marine craft data, for the area between a first location and the potential waypoint can be analyzed for preselected conditions at 610. In one example, analyzing the area between the first location and the potential waypoint includes identifying one or more preselected conditions in the area between the first location and the potential waypoint.

The one or more preselected conditions identified in the analysis can be used, along with other factors, in performing the marine route calculation algorithm to calculate the course so as to best avoid preselected conditions between the first location and the potential waypoint at 620. One approach to avoiding the preselected conditions includes re-routing the course to avoid the preselected conditions when the marine route calculation algorithm identifies one or more preselected conditions between the first location and the potential waypoint. Alert signals are provided to the user when the analyzed cartographic data, including the marine craft data, between the first location and the potential waypoint includes preselected conditions.

FIG. 7 is a flow chart illustrating an additional method according to an embodiment of the present invention. As shown in FIG. 7, a method for marine navigation is provided. The method includes identifying a user defined graphical filter area on a display at 700. In the various embodiments, identifying the user defined graphical filter area on the display can be accomplished through the use of a displayed cursor on a display screen, or through the display screen, as described in connection with FIG. 3. Cartographic data, including the marine craft data, within the user defined graphical filter area can be analyzed for preselected conditions at 710. An alert signal can be provided at 720 when cartographic data within the user defined graphical filter area indicate preselected conditions.

In an additional embodiment, the method can further provide dynamic analysis for preselected conditions within the user defined graphical filter area. So, the user defined graphical filter area can, for example, be repositioned from a first location to a second location on the display screen. The user defined graphical filter area can be dynamically analyzed for preselected conditions as a user drags the user defined graphical filter area across the display screen. Based on the analysis, alert signals can be provided to the user of the device when the analyzed cartographic data, including the marine craft data, for the user defined graphical filter area includes preselected conditions.

The method sequence shown in FIGS. 5-7 can be repeated as many times as necessary, without limitation, in order to achieve a desired course. In addition, the analyzed cartographic data, including the marine craft data, between the first location and the potential waypoint can also be stored in the memory of the device so as to be available for repeated attempts at calculating a course according to the present invention. Thus, the present invention provides a system, device and method by which information received for a course and a reroute calculation can be maintained.

In addition, other variations on the above scenario are included within the scope of the present invention. That is, calculating the re-route can include calculating the re-route with a preference for avoiding one or more preselected conditions in any previous course. Thus, embodiments of the present invention provide methods by which one or more course and/or re-route analysis and/or calculations provide a course that best avoids courses with preselected conditions.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for marine navigation, comprising:

receiving one or more preselected conditions from a user;

identifying a potential waypoint; and performing a marine route calculation algorithm to route a course between a first location and the potential waypoint avoiding the preselected conditions, including analyzing cartographic data between the first location and the potential waypoint and re-routing the course to avoid the preselected conditions by identifying one or more non-user selected waypoints.

2. The method of claim 1, further including determining the first location on the course based on a signal from a global positioning system (GPS); and analyzing cartographic data for a predetermined area around the first location for preselected conditions.

3. The method of claim 2, further including providing an alert signal when the analyzed cartographic data for the predetermined area around the first location includes preselected conditions.

4. The method of claim 1, further including providing an alert signal when the analyzed cartographic data between the first location and the potential waypoint includes preselected conditions.

5. The method of claim 4, wherein providing the alert signal includes emitting an audio alert.

6. The method of claim 4, wherein providing the alert signal includes displaying a visual alert.

7. The method of claim 1, the preselected conditions including a weather condition.

8. A method for marine navigation, comprising:

receiving one or more preselected conditions from a user;

receiving a user defined graphical filter area from the user;

identifying the user defined graphical filter area on a display;

analyzing cartographic data only within the user defined graphical filter area for the preselected conditions; and providing an alert signal when cartographic data within the user defined graphical filter area indicate the preselected conditions.

9. The method of claim 8, wherein identifying the user defined graphical filter area includes repositioning the user defined graphical filter area.

10. The method of claim 8, wherein analyzing cartographic data further comprises acquiring cartographic data from a global positioning system (GPS).

11. The method of claim 8, further including receiving preselected conditions selected from the group of land, water depth, rock(s), sandbars, shelves, tide condition, tidal data, wind conditions, weather conditions, ice, above-water obstacles, underwater obstacles, type of water bottom, and prohibited areas.

12. A computer readable medium having a set of computer readable instructions, the set of computer readable instructions comprising instructions for:

receiving one or more preselected conditions from a user;

identifying a potential waypoint upon a first event; and performing a marine route calculation algorithm to analyze a course between a first location and the potential waypoint avoiding the preselected conditions, including analyzing cartographic data between the first location and the potential waypoint and re-routing the course to avoid the preselected conditions by identifying one or more non-user selected waypoints.

13. The computer readable medium of claim 12, further including determining the first location on the course based on a signal from a global positioning system (GPS); and analyzing cartographic data for a predetermined area around the first location for preselected conditions.

14. The computer readable medium of claim 13, further including providing an alert signal when the analyzed cartographic data for the predetermined area around the first location includes preselected conditions.

15. The computer readable medium of claim 12, wherein analyzing cartographic data further comprises acquiring cartographic data from a global positioning system (GPS).

16. The computer readable medium of claim 12, further including providing an alert signal when the analyzed cartographic data between the first location and the potential waypoint includes preselected conditions.

17. The computer readable medium of claim 16, wherein providing the alert signal includes emitting a signal for an audio alert.

18. The computer readable medium of claim 16, wherein providing the alert signal includes displaying a visual alert.

19. The computer readable medium of claim 12, the preselected conditions including a water depth.

20. An electronic marine navigation device, comprising:

a processor;

a user interface operatively coupled to the processor, wherein the user interface receives one or more preselected conditions from a user;

a location input operatively coupled to the processor, wherein the location input receives a first location and a potential waypoint separate from the first location; and a memory operatively coupled to the processor and the location input, the memory having cartographic data including data related to the preselected conditions, wherein the processor operates on a marine route calculation algorithm to analyze a course between the first location and the potential waypoint in view of the preselected conditions of the cartographic data and re-route the course to avoid the preselected conditions by identifying one or more non-user selected waypoints.

21. The electronic marine navigation device of claim 20, further including a receiver for a global positioning system (GPS) operatively coupled to the processor, wherein the processor determines the first location on the course based on a signal received from the GPS, and analyzes cartographic data for a predetermined area around the first location for preselected conditions.

22. The electronic marine navigation device of claim 21, wherein the processor provides an alert signal when the analyzed cartographic data for the predetermined area around the first location includes preselected conditions.

23. The electronic marine navigation device of claim 20, wherein the processor provides an alert signal when the analyzed cartographic data between the first location and the potential waypoint includes preselected conditions.

24. The electronic marine navigation device of claim 20, wherein the location input receives a user defined graphical filter area, and wherein the processor operates on the marine route calculation algorithm to analyze cartographic data within the defined graphical filter area for preselected conditions and wherein the processor provides an alert signal when the analyzed cartographic data for the user defined graphical filter area includes preselected conditions.

25. The method of claim 1, wherein both the first location and the potential waypoint are independent of a current location of a device implementing the method.

26. The method of claim 1, wherein at least a portion of the course is unrelated to a current heading of a device implementing the method.

27. A method for marine navigation, comprising:

identifying a potential waypoint; and performing a marine route calculation algorithm to analyze a course between a first location and the potential waypoint in order to avoid preselected conditions received from a user and re-route the course to avoid the preselected conditions by identifying one or more non-user selected waypoints.

28. A method for marine navigation, comprising:

receiving indication of a minimum water depth from a user;

identifying a potential waypoint; and performing a marine route calculation algorithm to route a course between a first location and the potential waypoint avoiding water depth less than the minimum water depth by identifying one or more non-user selected waypoints.

29. The method of claim 28, displaying a visual indication of places along the calculated course where the water depth is expected to approach the minimum water depth.

30. A method for marine navigation, comprising:

receiving indication of a minimum water depth from a user;

displaying marine cartographic data;

receiving indication of a potential waypoint;

displaying a substantially straight line between a first location and the potential waypoint, wherein the line depicts both where the water depth is expected to be greater than the minimum water depth and where the water depth is expected to be less than the minimum water depth, and wherein the line highlights where the water depth is expected to be less than the minimum water depth; and performing a marine route calculation algorithm to route a course between the first location and the potential waypoint avoiding water depth less than the minimum water depth.

31. A method for marine navigation, comprising:

displaying marine cartographic data;

receiving indication of a potential waypoint;

displaying a substantially straight line between a first location and the potential waypoint, wherein the line distinguishes where the water depth is expected to be greater than a preset minimum water depth from where the water depth is expected to be less than the minimum water depth; and performing a marine route calculation algorithm to route a course between the first location and the potential waypoint avoiding water depth less than the minimum water depth.

32. The method of claim 31, wherein the minimum water depth is user selectable.

33. The method of claim 31, wherein the line is depicted in a first manner where the water depth is expected to be greater than the minimum water depth and the line is depicted in a second manner where the water depth is expected to be less than the minimum water depth.

34. The method of claim 31, wherein the line is displayed on the marine cartographic data in a plan view.

35. The method of claim 33, wherein the first manner is different from the second manner, such that the line itself is displayed differently in the first manner compared with the second manner.

36. The method of claim 33, wherein the first manner comprises displaying the line in a first color and the second manner comprises displaying the line in a second color different from the first color.

37. A method for marine navigation, comprising:

displaying marine cartographic data;

receiving indication of a potential waypoint; and displaying a substantially straight line on the marine cartographic data between a first location and the potential waypoint, wherein the line is displayed in a different manner where the water depth is expected to be less than a minimum water depth.

38. The method of claim 37, further including the step of performing a marine route calculation algorithm to route a course from the first location to the potential waypoint avoiding areas where the water depth is expected to be less than the minimum water depth by identifying one or more non-user selected waypoints.

39. The method of claim 38, further including the step of displaying the course from the first location to the potential waypoint via the non-user selected waypoints.

40. The method of claim 37, wherein the line is displayed in a different manner where the water depth is expected to be less than a minimum water depth.

41. The method of claim 1, further including the step of displaying the course from the first location to the potential waypoint via the non-user selected waypoints.

42. The computer readable medium of claim 12, further including instructions for displaying the course from the first location to the potential waypoint via the non-user selected waypoints.

43. The electronic marine navigation device of claim 20, further including a display for displaying the course from the first location to the potential waypoint via the non-user selected waypoints.

44. The method of claim 27, further including the step of displaying the course from the first location to the potential waypoint via the non-user selected waypoints.

45. The method of claim 28, further including the step of displaying the course from the first location to the potential waypoint via the non-user selected waypoints.

46. The method of claim 30, wherein the step of performing a marine route calculation algorithm includes identifying one or more non-user selected waypoints.

47. The method of claim 46, further including the step of displaying the course from the first location to the potential waypoint via the non-user selected waypoints.

48. The method of claim 30, wherein the line is displayed in a first manner where the water depth is expected to be greater than the preset minimum water depth and a second manner, different from the first manner, where the water depth is expected to be less than the minimum water depth.

49. The method of claim 31, wherein the step of performing a marine route calculation algorithm includes identifying one or more non-user selected waypoints.

50. The method of claim 49, further including the step of displaying the course from the first location to the potential waypoint via the non-user selected waypoints.

* * * * *